(12) United States Patent
Ding et al.

(10) Patent No.: US 12,235,091 B2
(45) Date of Patent: Feb. 25, 2025

(54) APPARATUS TO CHARACTERIZE SUBSTRATES AND FILMS

(71) Applicant: Onto Innovation Inc., Wilmington, MA (US)

(72) Inventors: Jian Ding, Methuen, MA (US); Nathan Unruh, Hillsboro, OR (US); Ju Jin, Edina, MN (US); Nazar Orishchin, Savage, MN (US)

(73) Assignee: Onto Innovation Inc., Wilmington, MA (US)

( * ) Notice: Subject to any disclaimer, the term of this patent is extended or adjusted under 35 U.S.C. 154(b) by 210 days.

(21) Appl. No.: 17/871,384

(22) Filed: Jul. 22, 2022

(65) Prior Publication Data
US 2024/0027186 A1 Jan. 25, 2024

(51) Int. Cl.
*G01B 11/06* (2006.01)
*G01N 21/21* (2006.01)

(52) U.S. Cl.
CPC ......... *G01B 11/0641* (2013.01); *G01N 21/21* (2013.01); *G01B 2210/56* (2013.01)

(58) Field of Classification Search
CPC . G01B 11/0641; G01B 2210/56; G01N 21/21
See application file for complete search history.

(56) References Cited

U.S. PATENT DOCUMENTS

| | | | |
|---|---|---|---|
| 7,286,243 B2 | 10/2007 | Rosencwaig | |
| 9,634,227 B1 * | 4/2017 | Thalmayr | H03H 9/02338 |
| 2003/0058442 A1 * | 3/2003 | Garab | G02B 21/002 356/369 |

(Continued)

FOREIGN PATENT DOCUMENTS

| | | |
|---|---|---|
| JP | H10293011 | 11/1998 |
| JP | H10293011 A * | 11/1998 |

(Continued)

OTHER PUBLICATIONS

English Machine translation of JPH10293011A (Year: 1998).*

(Continued)

*Primary Examiner* — Dominic J Bologna
(74) *Attorney, Agent, or Firm* — Schwegman Lundberg & Woessner, P.A.

(57) ABSTRACT

Various examples include an apparatus to characterize substrate and film thicknesses of the substrate and films formed thereon. The apparatus uses one or more wavelengths of light from a light source (e.g., a swept laser) to interrogate the substrate. The light is directed substantially orthogonally to an upper surface of the substrate. A polarizer and an analyzer element are coupled between the light source and the substrate. Therefore, the polarizer and the analyzer are both located in the beam propagation path from the light source to the substrate. An optical detector is arranged substantially orthogonally to the upper surface of the substrate. The optical detector receives light returned back from the substrate. The apparatus is capable of determining the thickness of the substrate and one or more films contained thereon, regardless of substrates having optical anisotropies, such as chiral characteristics or stress-induced films. Other apparatuses and methods are also disclosed.

18 Claims, 7 Drawing Sheets

(56) References Cited

U.S. PATENT DOCUMENTS

| | | | | |
|---|---|---|---|---|
| 2010/0296092 A1* | 11/2010 | Cho | ..................... | G01N 21/211 |
| | | | | 356/369 |
| 2010/0321671 A1* | 12/2010 | Marx | ..................... | G01B 11/22 |
| | | | | 702/172 |
| 2011/0199521 A1* | 8/2011 | Kato | ................. | H01L 27/14625 |
| | | | | 348/294 |
| 2016/0153894 A1* | 6/2016 | Cho | ......................... | G01J 4/00 |
| | | | | 356/364 |
| 2018/0180406 A1* | 6/2018 | Sapiens | ............... | G03F 7/70625 |
| 2022/0209045 A1* | 6/2022 | Sorger | .................... | H01L 33/06 |

FOREIGN PATENT DOCUMENTS

| | | |
|---|---|---|
| JP | 2009192331 | 8/2009 |
| TW | 200409904 | 6/2004 |
| TW | 202419818 | 5/2024 |
| WO | 2024020136 | 1/2024 |

OTHER PUBLICATIONS

"International Application Serial No. PCT US2023 028236, International Search Report mailed Nov. 9, 2023 International Application Serial No. PCT US2023 028236, Written Opinion mailed Nov. 9, 2023", 3 pages.

"International Application Serial No. PCT US2023 028236, Written Opinion mailed Nov. 9, 2023", 6 pages.

"Taiwanese Application Serial No. 112127196, Office Action mailed Jul. 23, 2024", with English translation of Search Report, 13 pages.

\* cited by examiner

APPARATUS TO CHARACTERIZE SUBSTRATES AND FILMS

TECHNOLOGY FIELD

The disclosed subject matter is related generally to the field of metrology tools used in the semiconductor and allied industries (e.g., flat-panel display and solar-cell production facilities). More specifically, in various embodiments, the disclosed subject matter is related to the measurement of substrates (e.g., such as silicon wafers) and films formed on the substrates.

BACKGROUND

One aspect of semiconductor manufacturing is the measurement of substrate thickness. Current technologies for measuring substrate thickness includes, for example, capacitive sensors, which measures the capacitance of a substrate, height-sensor techniques that utilize two sensors, with one sensor above the substrate and one sensor below the substrate, and reflectometers. The use of capacitive sensors typically requires an in-depth knowledge of the material comprising the substrate. Further, capacitive sensors can generally only function correctly with a single substrate material, not substrates composed of multiple layers of different materials, such as silicon-on-insulator (SOI) substrates, substrates supported by carriers, or handle substrates. Additionally, capacitive sensors have a lower thickness limit of approximately 200 microns and are limited to a small sample of materials.

Height sensor techniques and reflectometry-based techniques are similarly limited. For example, height-sensor techniques can generally function on thinner samples, and can accommodate multiple layer wafer stacks that are made of virtually any material as they detect the physical surface of a wafer. However, height-sensor techniques do require delicate alignment in all three axes and require calibration to teach the sensor how far apart the axes are in space. This calibration requirement is the lower accuracy limit of the measurements taken.

Current reflectometers do not condition a polarization state of the incident light source (e.g., a laser) on a substrate. Further, current reflectometers do not analyze for light returned from the substrate. Consequently, current reflectometers cannot be used to measure accurately substrates having optical anisotropy such as chiral characteristics or stress-induced films.

Additionally, substrates having multiple layers or substrates having chiral characteristics can currently only be measured by methods such as ellipsometry. However, ellipsometry techniques require specialized training and can be costly and time consuming. Therefore, there is a need for an apparatus to accurately and precisely measure substrate thicknesses, as well as films formed thereon. Ideally, such an apparatus should be relatively easy, inexpensive, and fast to use.

SUMMARY

This document describes, among other things, an apparatus to characterize substrate and film thicknesses and other metrics of the substrate and films formed thereon. The apparatus uses one or more wavelengths of light from a light source (e.g., a swept laser) to interrogate the substrate. The light is directed substantially orthogonally to an upper surface of the substrate. A polarizer and an analyzer element are both coupled between the light source and the substrate. In various embodiments, the polarizer and the analyzer may comprise a single element. Therefore, the polarizer and the analyzer are both located in the beam propagation path from the light source to the substrate. An optical detector is arranged substantially orthogonally to the upper surface of the substrate. The optical detector receives light returned back from the substrate. The apparatus is capable of determining the thickness of the substrate and one or more films contained thereon, regardless of substrates having chiral characteristics or stress-induced films.

In various embodiments, the disclosed subject matter is a metrology apparatus to measure a thickness of a substrate. The metrology apparatus includes an illumination source directed substantially orthogonally to an upper surface of the substrate and a polarizer coupled between the illumination source and the substrate. The substrate is to receive light from the illumination source after the light passes through the polarizer in a pre-determined state of polarization. An optical detector is to receive light returned from the substrate, the optical detector is arranged substantially orthogonally to the upper surface of the substrate and between the illumination source and the substrate. An analyzer is coupled between the substrate and the optical detector. The analyzer is configured to determine an angle in the plane of polarization to which the light received from the substrate has been rotated due to optical properties of at least one of the substrate and films formed on the substrate.

In various embodiments, the disclosed subject matter is a method for measuring the thickness of a substrate. The method includes setting a polarization state of a light source; selecting at least one wavelength from the light source; setting an analyzer component based on a returned light signal from the substrate; impinging a beam of light from the light source substantially orthogonally onto the substrate; and calculating a thickness of the substrate based on the returned light signal from the substrate.

In various embodiments, the disclosed subject matter is a metrology apparatus to measure a thickness of a substrate having chiral properties. The metrology apparatus includes an illumination source directed substantially orthogonally to an upper surface of the substrate and a polarizer coupled between the illumination source and the substrate. The substrate is to receive light from the illumination source after the light passes through the polarizer in a pre-determined plane of polarization. An optical detector is to receive light returned from the substrate, with the optical detector arranged substantially orthogonally to the upper surface of the substrate. An analyzer is coupled between the substrate and the optical detector. The analyzer is to determine an angle in the plane of polarization to which the light received from the substrate has been rotated due to the chiral properties of the substrate, with each of the polarizer and the analyzer being located in a common optical path. At least one optical compensator is to determine an optical path difference between the illumination source and the received light returned back from the substrate.

BRIEF DESCRIPTION OF FIGURES

Various ones of the appended drawings merely illustrate example implementations of the present disclosure and should not be considered as limiting its scope.

DETAILED DESCRIPTION

Figure 1:
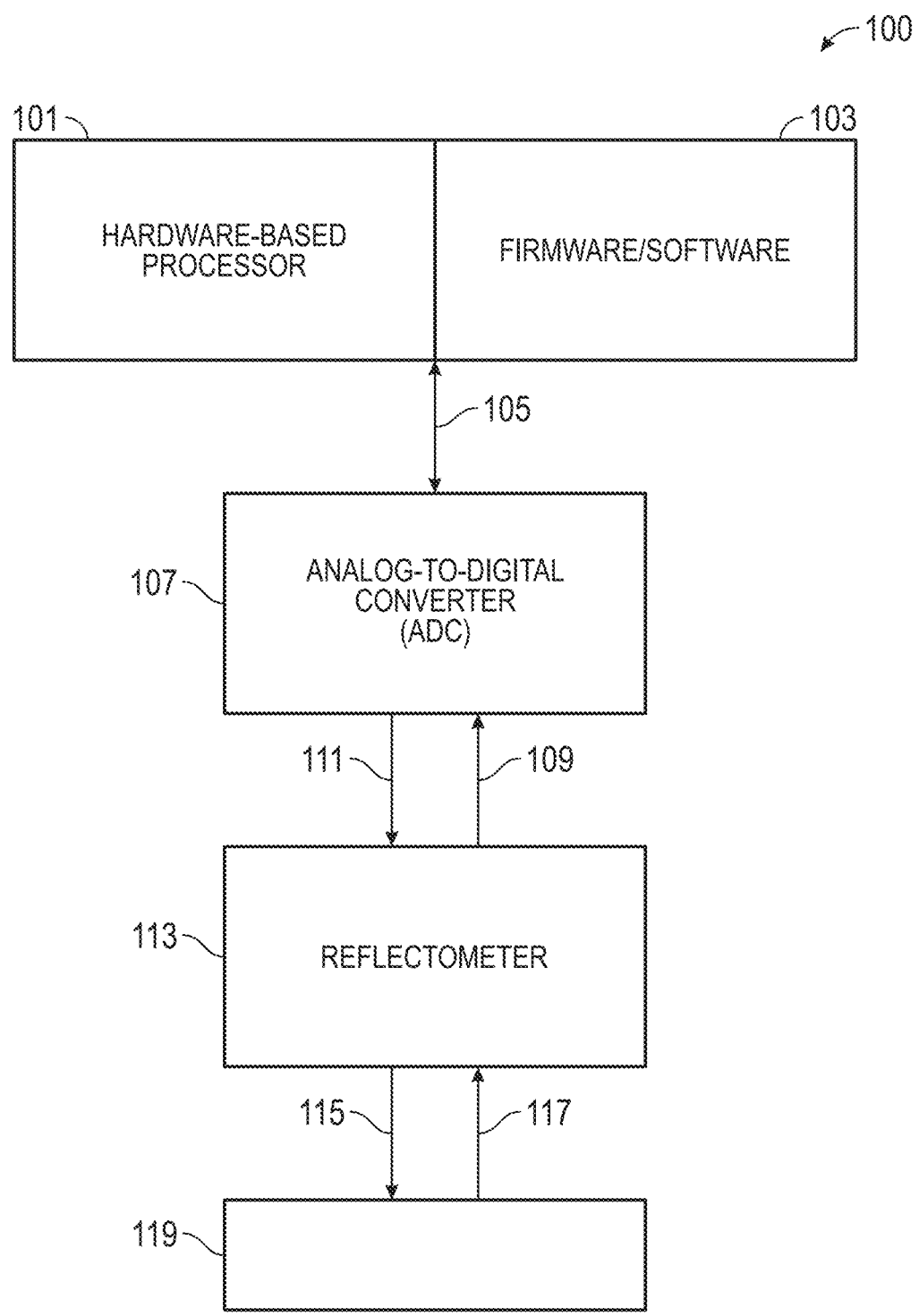
FIG. 1 shows a high-level example of a system to characterize substrate and film thicknesses and other metrics of the substrate and films formed thereon, in accordance with various embodiments of the disclosed subject matter.

The disclosed subject matter is directed to a polarization-controlled sensor capable of characterizing layered thicknesses of one or more materials with optical anisotropy such as chiral objects and films having at least portions of the films that may be stress-induced. In normal-incidence reflectometers, there is currently no conditioning of the polarization state of the incident light source (e.g., a laser used as the light source). Further, there is no analysis for the light returned from the object being interrogated (measured), such as a substrate or a substrate having films formed thereon.

Optical anisotropy, such as chirality, causes standard metrology tools, such as a standard reflectometer, to misread the actual thickness of various materials. A linearly polarized light will rotate either to the left (counter-clockwise) or right (clockwise) when passed through a sample having optical anisotropy properties. The amount by which the light is rotated is known as the angle-of-rotation. The direction (clockwise or counterclockwise) and magnitude of the rotation reveals information about optical anisotropy properties of the sample, such as, for example, the relative concentration of enantiomers present in the sample in the case of chirality.

In general, one type of optical anisotropy, chirality, is an optical structure or property, such as the configuration of a molecule or the spin of a particle, that renders the structure or property distinguishable from its mirror image or symmetrical opposite. A molecule or ion is considered to be chiral if the molecule or ion cannot be superposed on its mirror image by any combination of rotations, translations, and some conformational changes. A chiral molecule or ion exists in two stereoisomers that are mirror images of each other, called enantiomers. The enantiomers are often distinguished as either "right-handed" or "left-handed" by their absolute configuration or some other criterion. Two enantiomers have the same physical properties, except that they often have opposite optical characteristics. Consequently, substrates having chiral properties can often not be measured readily or accurately by optically-based metrology tools.

In various embodiments, the disclosed subject matter is a metrology tool that uses a light source having an incidence-angle relative to an upper surface of a substrate set to approximately 0 degrees (i.e., substantially orthogonal to the substrate). A polarization control is provided in the interrogation beam path and between the sensor device and the substrate. Additionally, an analyzer component is provided in the return beam path and between the substrate and the sensor device. In various embodiments, the polarization control can also serve the purpose of the analyzer. In embodiments, the light source is set to a polarization state matching the eigenmode of the substrate (e.g., the eigenmode of silicon if the substrate comprises a silicon wafer). In embodiments, specific information regarding one or more film layers can be input to the sensor device to determine indices-of-refraction and thicknesses of the layers. The indices-of-refraction and thicknesses of the layers can be determined regardless of the optical anisotropy of the materials. In embodiments, the disclosed subject matter is a metrology tool that can characterize a thinned substrate, such as a thinned silicon wafer. The characterization can include measuring a thickness of the substrate as well determining anisotropies within the substrate introduced by a thinning process.

In general, standard reflectometers measure the thickness of transparent layers of a wafer by measuring the wavelength dependence of the Fabry-Perot interference that occurs in the reflected or transmitted light. When a layer is illuminated with a spatially-coherent beam of light, both the upper and lower surfaces of the substrate and/or films cause a reflection. These reflections interfere with each other, and the reflected light amplitude can be large or small depending on whether the interference is constructive or destructive. The interference depends on layer thickness, its index-of-refraction, and the wavelength of the light. A layer is defined as any homogeneous medium with approximately parallel upper and lower surfaces. Examples are films deposited on a substrate, and the substrate itself, such as a silicon wafer. These interference patterns are discussed in more detail, below.

For example, the reflected intensity for a single layer is:

$$R = \left| \frac{r_1 + r_2 e^{i2\delta}}{1 + r_1 r_2 e^{i2\delta}} \right|^2$$

where $r_1$ is the reflection coefficient at the first surface, $r_2$ is the reflection coefficient at the second surface, $\partial = 2\pi n l/\lambda$, n is the index-of-refraction, l is the thickness, and $\lambda$ is the wavelength. Due to the complex exponential, the reflected intensity is periodic in $\partial$. Since $\partial$ is proportional to optical frequency (c/$\lambda$), the reflected intensity is periodic in optical frequency with period c/2 nl, where n is the index-of-refraction, l is the layer thickness, and c is the speed of light in a vacuum.

As described below, the advanced metrology tool of the disclosed subject matter incorporates a light source that consists of a single wavelength light source, multiple wavelengths, or a light source that sweeps through multiple wavelengths over time. The reflected light is then analyzed for its dependence on wavelength. By determining the period of the reflected intensity with optical frequency, (optical frequency is inversely proportional to wavelength), the thickness of a substrate and/or layer can be determined, if the index-of-refraction is also known. Reflectometers can be used to measure the thickness or index of a transparent layer, if the other factor is known. If the light source uses infrared wavelengths, and specifically wavelengths longer than, for example, 1.4 µm, then the thickness of, for example, a silicon substrate can be measured with a reflectometer. Also as described below, the advanced reflectometer of the disclosed subject matter can also be used to measure structures-having optical anisotropy or stress-induced substrates and/or film layers.

When the object to be measured consists of multiple layers, the equation for the reflected intensity contains terms that combine the various combinations of thickness. As noted above, the resulting reflected spectrum contains several periodicities, such as the period corresponding to the optical thickness of each individual layer, and the period corresponding to the total optical thickness.

To produce a sufficient interference signal, which is observed through the fringe visibility of the reflected signal, the reflections from the upper and lower surfaces of the substrate comprise similar beam divergences. For example, if the beam on the substrate is collimated, then the reflected beams from the front surface and the lower surface will be collimated, and the interference will be strong and fringe visibility high.

When a substrate consists of multiple layers, Fabry-Perot interference causes a reflected signal to consist of multiple periodicities in optical frequency. The reflected signal can be analyzed to recover the thickness of the substrate as well as the thicknesses of other layers on the substrate. However, as noted above, standard reflectometers are unable to measure accurately chiral substrate or films having induced stress.

With reference now to FIG. 1, a high-level example of a metrology system 100 to characterize substrate and film thicknesses and other metrics of the substrate and films formed thereon, in accordance with various embodiments of the disclosed subject matter, is shown. The metrology system 100 is shown to include a hardware-based processor 101 coupled to a firmware and/or software component 103 for control and analysis of signals received from the metrology system 100. The hardware-based processor 101 and the firmware/software component 103 are electrically coupled to supply signals to and receive signals from an analog-to-digital converter (ADC) 107 through a bi-directional communications path 105. The ADC 107 converted analog signals are received from an analyzer-type reflectometer 113 through communications path 109. The ADC 107 further supplies signals to control the analyzer-type reflectometer 113 through a communications path 111.

The analyzer-type reflectometer 113 provides an interrogating light source 115 substantially orthogonal to the surface of a substrate 119. The substrate 119 may be, for example, a bare silicon wafer with or without one or more layers of films formed thereon. Reflected, refracted, and scattered-light forms of signals 117 are received from the substrate 119 by the analyzer-type reflectometer 113. The signals received from and supplied to the analyzer-type reflectometer 113 are described in more detail below. For example, the hardware-based processor 101 coupled to the firmware and/or software component 103 can be used for control and analysis of signals received from the analyzer-type reflectometer 113. In embodiments, the firmware and/or software component 103 may also be at least partially hardware based, including, for example, a special-purpose processor, such as a field-programmable gate array (FPGA) or an application-specific integrated circuit (ASIC) that is programmed, in software, firmware, or as a hardware implementation, to perform one or more aspects related to the disclosed subject matter described herein.

In various embodiments, the hardware-based processor 101 and the firmware and/or software component 103 can be used to determine a thickness or thicknesses of substrates and substrates with films formed thereon by performing a Fourier analysis of the signals 117 initially received by the analyzer-type reflectometer 113 from the substrate 119. For example, the hardware-based processor 101 and the firmware and/or software component 103, after receiving a digital signal from the ADC 107 through the bi-directional communications path 105, can perform operations including (1) a Fourier transform of the digital signals; (2) find a peak amplitude from the digital signals; and (3) calculate a thickness or thicknesses of the substrate and films contained thereon. Each of these operations is described in more detail below.

The substrate 119 may comprise, for example, various types of substrates, such as a wafer comprising elemental semiconductors (e.g., silicon or germanium), a wafer comprising compound semiconductors (e.g., gallium arsenide (GaAs) or gallium nitride (GaN)), or variety of other substrate types known in the art (including conductive, semiconductive, and non-conductive substrates). Consequently, the substrate 119 may comprise, for example, any one or more of 400 mm, 300 mm, 200 mm, 150 mm, 125 mm, and 100 mm round substrates (e.g., wafers), or of other shapes and/or dimensions, including opaque (e.g., at visible wavelengths), clear, and bonded substrates.

Figure 2:
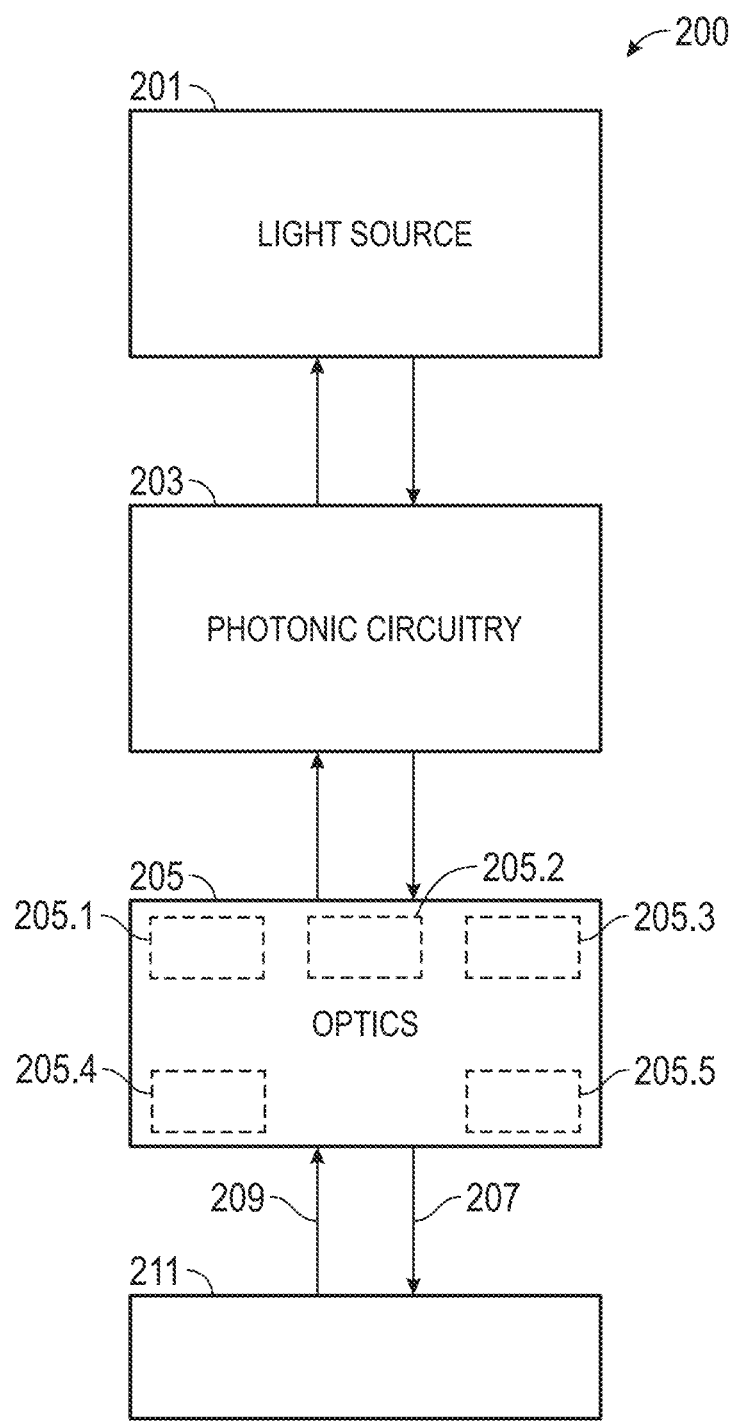
FIG. 2 shows additional exemplary details of a portion of the system of FIG. 1 in accordance with various embodiments of the disclosed subject matter.

FIG. 2 shows additional exemplary details of a portion 200 of the metrology system 100 of FIG. 1 in accordance with various embodiments of the disclosed subject matter. FIG. 2 is shown to include a light source 201, a photonic-circuitry component 203, optical elements 205, and a substrate 211. A combination of the light source 201, the photonic-circuitry component 203, and the optical elements 205 may be the same as or similar to the analyzer-type reflectometer 113 of FIG. 1. Further, although the portion 200 of the metrology system 100 is shown to include three discrete elements (the light source 201, the photonic-circuitry component 203, and the optical elements 205), the three elements are shown merely to assist a person of ordinary skill in the art in recognizing and understanding relevant portions of the disclosed subject matter. For example, some or all of the discrete elements may be combined into a single component.

In various embodiments, the light source 201 is an illumination source that may comprise a swept laser. A swept laser is a type of laser in which the output wavelength of the laser is adjustable over a wide range of wavelengths. Selected wavelengths, and a rate over which the wavelengths are changed, may either be set by its own controller, a remote controller, or pre-determined by a combination of the hardware-based processor 101 and the firmware/software component 103 of FIG. 1 supplying appropriate signals to the analyzer-type reflectometer 113 through the ADC 107. In other embodiments, the light source 201 may comprise a broadband light-source, such as a broadband, incoherent infrared- or ultraviolet-source or a broadband, incoherent visible-light-source.

The photonic-circuitry component 203 may include a number of different photonic devices. For example, photonic devices can include components for creating, manipulating, and/or detecting light. These components can include laser diodes, light-emitting diodes, optical amplifiers, and other components to generate, detect, or manipulate (e.g., split, recombine, and/or circulate) light. In various embodiments, the photonic-circuitry component 203 can also include an optical detector to receive light returned from the substrate.

The optical detector is arranged so that it receives light substantially orthogonally from an upper surface of the substrate 211. The optical detector can comprise, for example, a photodetector or a spectrometer. The choice of using a photodetector or a spectrometer may be determined, at least partially, on a configuration of the light source 201.

In various embodiments, the optical elements 205 may comprise a collimator 205.1 and an objective lens. The collimator may be used to convert diverging light or other radiation emitted by the light source 201 into a parallel beam of light to be impinged substantially orthogonally with reference to an upper surface of the substrate 211. In various embodiments, the objective lens can be used to focus the beam of light onto the substrate 211. The objective lens is also used to collect the light returned from the substrate 211. The optical elements 205 may also comprise an optical detector 205.2, such as photodetector or a spectrometer, as described above. Consequently, in various embodiments, the photodetector or the spectrometer may be contained within the photonic-circuitry component 203.

Either the photonic-circuitry component 203 or the optical elements 205 can also include a polarizer, 205.3 an analyzer 205.4, wave plates (e.g., a ¼-wave plate), and at least one optical compensator 205.5. The substrate 211 receives light from the light source 201 after the light passes through the polarizer in a pre-determined plane of polarization. For example, light from the light source 201 can be rotated to a polarization state so that the light incident on sample to matches an eigenmode of the sample.

The analyzer is used to determine an angle in the plane of polarization to which the light received from the substrate 211 has been rotated due to the optical properties of the substrate 211 and films. For example, the optical properties of a substrate can include light rotated in a plane of polarization due to chiral properties of a substrate.

The at least one optical compensator can be used to determine an optical path difference between the light source 201 and the received light returned back from the substrate 211. The optical path difference can be used to determine the phase of light, which can determine interference and diffraction of light as the light propagates as described in more detail below.

The substrate 211 may be, for example, a bare silicon wafer with or without one or more layers of films formed thereon. Consequently, the substrate 211 may be the same as or similar to the substrate 119 of FIG. 1.

Figure 3:
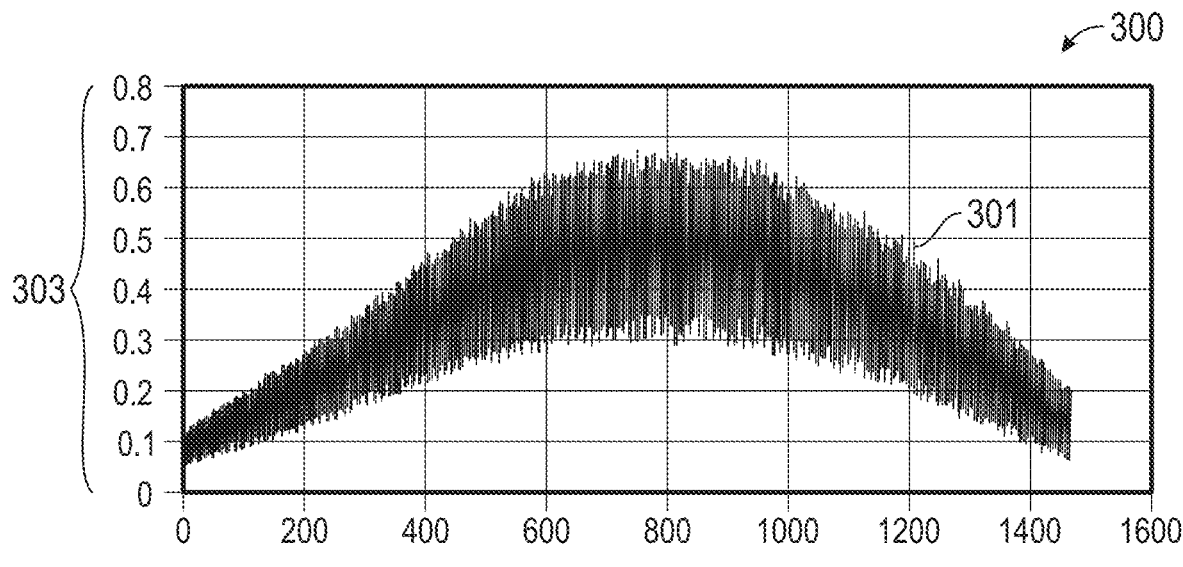
FIG. 3 shows an example graph of signals received from a silicon wafer having a nominal thickness of 780 µm as a function of the frequency of the interrogating laser.

FIG. 3 shows an example graph 300 of signals 301 received from a silicon wafer having a nominal thickness of approximately 780 μm. The received signals are shown as a function of the frequency of the interrogating laser. The signals 301 form an envelope of fringe patterns received from the substrate. The ordinate axis (the y-axis or the vertical axis) is an arbitrary detector voltage 303 received by the system of FIGS. 1 and 2.

FIGS. 4A through 4D show examples of graphs 400, 410, 420, 430 of signals received from a silicon wafer having a nominal thickness of approximately 780 μm as a function of the wavelength of the interrogating laser at various polarization states.

Figure 4A:
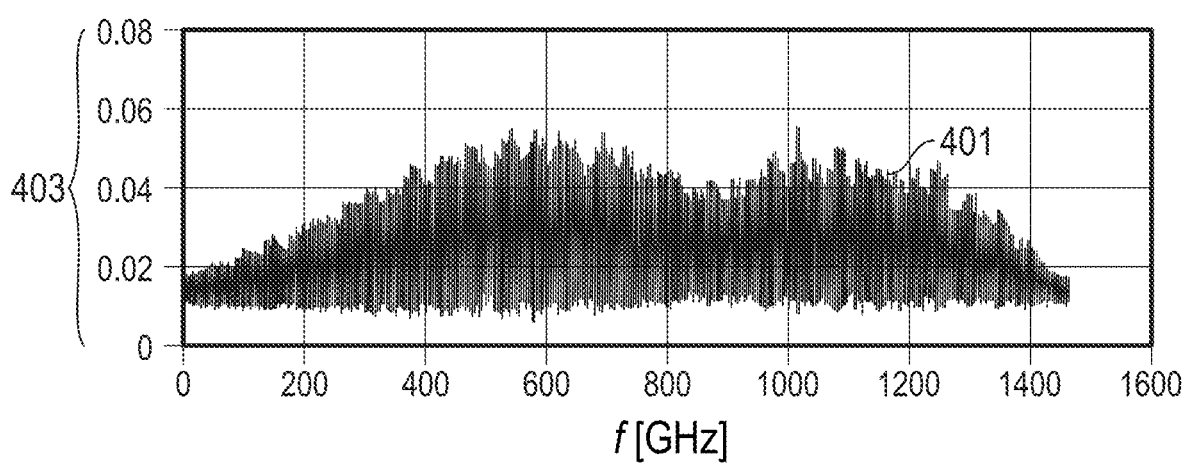
FIGS. 4A through 4D show examples of graphs of signals received from a silicon wafer having a nominal thickness of approximately 780 µm as a function of the frequency of the interrogating laser at various polarization states.

FIG. 4A shows an exemplary graph 400 with signals 401 received from a silicon wafer of approximately 780 μm in thickness. The signals 401 form an envelope of fringe patterns received from the substrate. The interrogating laser was set to a polarization state of about degrees (in this example, the silicon wafer includes a notch defined as −90 degrees). The ordinate axis is an arbitrary detector voltage 403 received by the system of FIGS. 1 and 2.

Figure 4B:
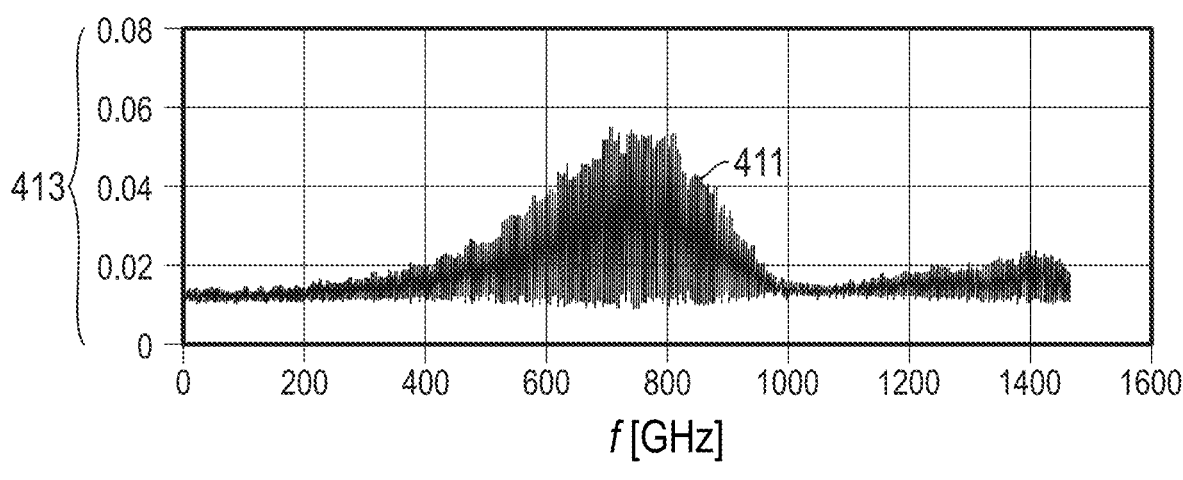

FIG. 4B shows an exemplary graph 410 with signals 411 received from a silicon wafer of approximately 780 μm in thickness. The signals 411 form an envelope of fringe patterns received from the substrate. The interrogating laser was set to a polarization state of about degrees (in this example, the silicon wafer includes a notch defined as −90 degrees). The ordinate axis is an arbitrary detector voltage 413 received by the system of FIGS. 1 and 2.

Figure 4C:
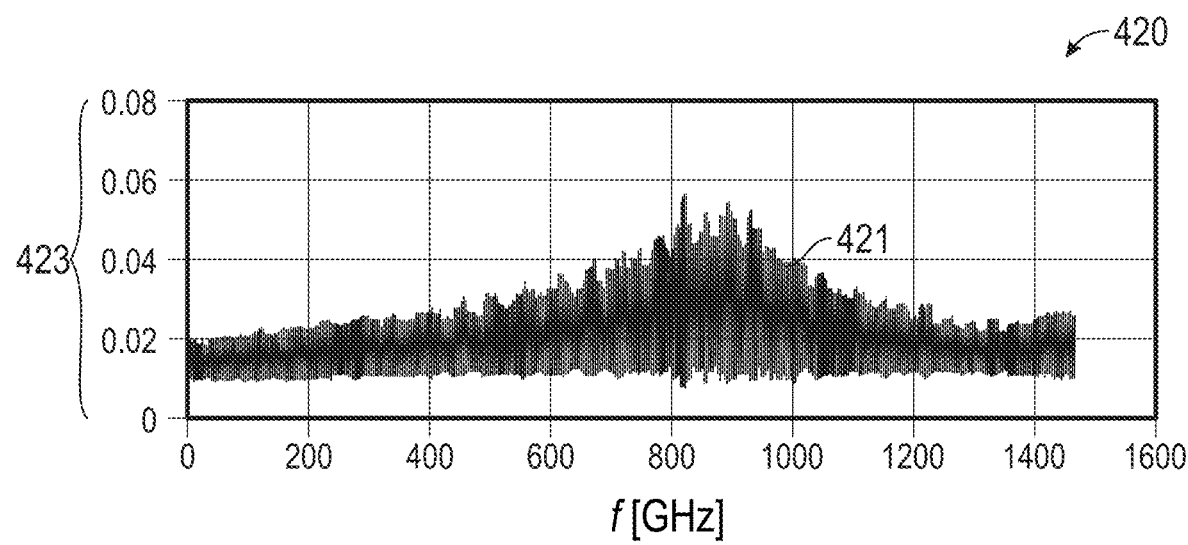

FIG. 4C shows an exemplary graph 420 with signals 421 received from a silicon wafer of approximately 780 μm in thickness. The signals 421 form an envelope of fringe patterns received from the substrate. The interrogating laser was set to a polarization state of about degrees (in this example, the silicon wafer includes a notch defined as −90 degrees). The ordinate axis is an arbitrary detector voltage 423 received by the system of FIGS. 1 and 2.

Figure 4D:
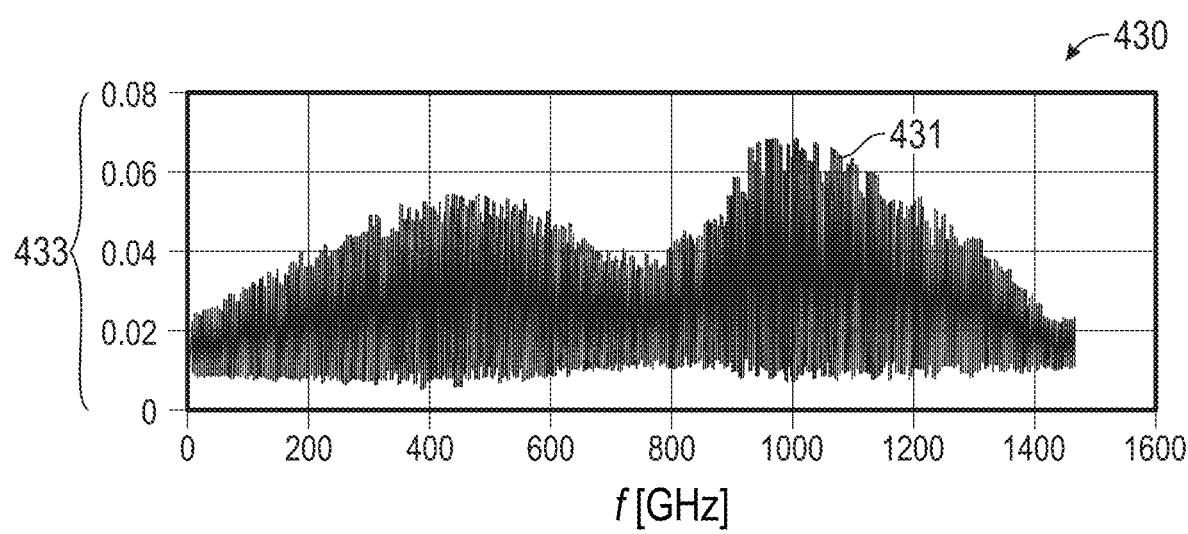

FIG. 4D shows an exemplary graph 430 with signals 431 received from a silicon wafer of approximately 780 μm in thickness. The signals 431 form an envelope of fringe patterns received from the substrate. The interrogating laser was set to a polarization state of about 135 degrees (in this example, the silicon wafer includes a notch defined as −90 degrees). The ordinate axis is an arbitrary detector voltage 433 received by the system of FIGS. 1 and 2.

Figure 5A:
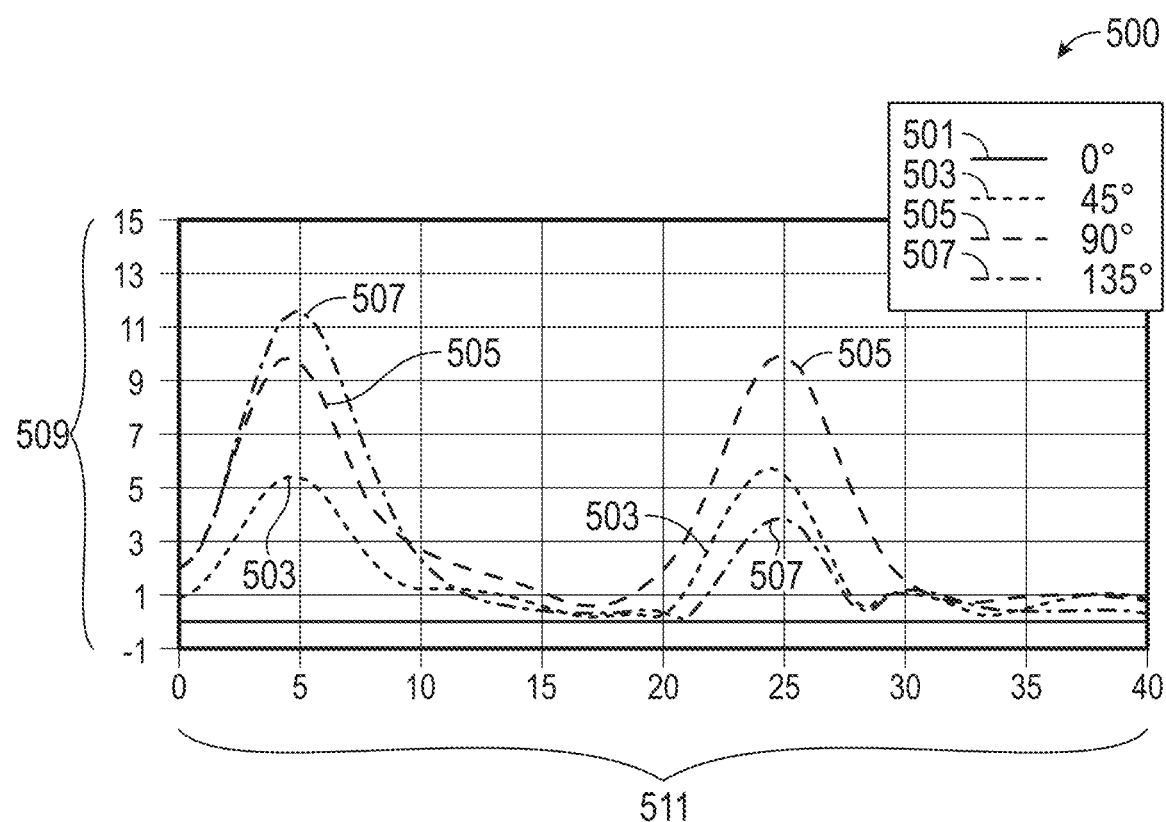
FIGS. 5A and 5B show examples of graphs of Fourier transform amplitudes versus thickness for the received signals of FIG. 4A through, FIG. 6A shows an example graph of signals received from a silicon wafer having a nominal thickness of approximately 70 µm as a function of the frequency of the interrogating laser.
Figure 5B:
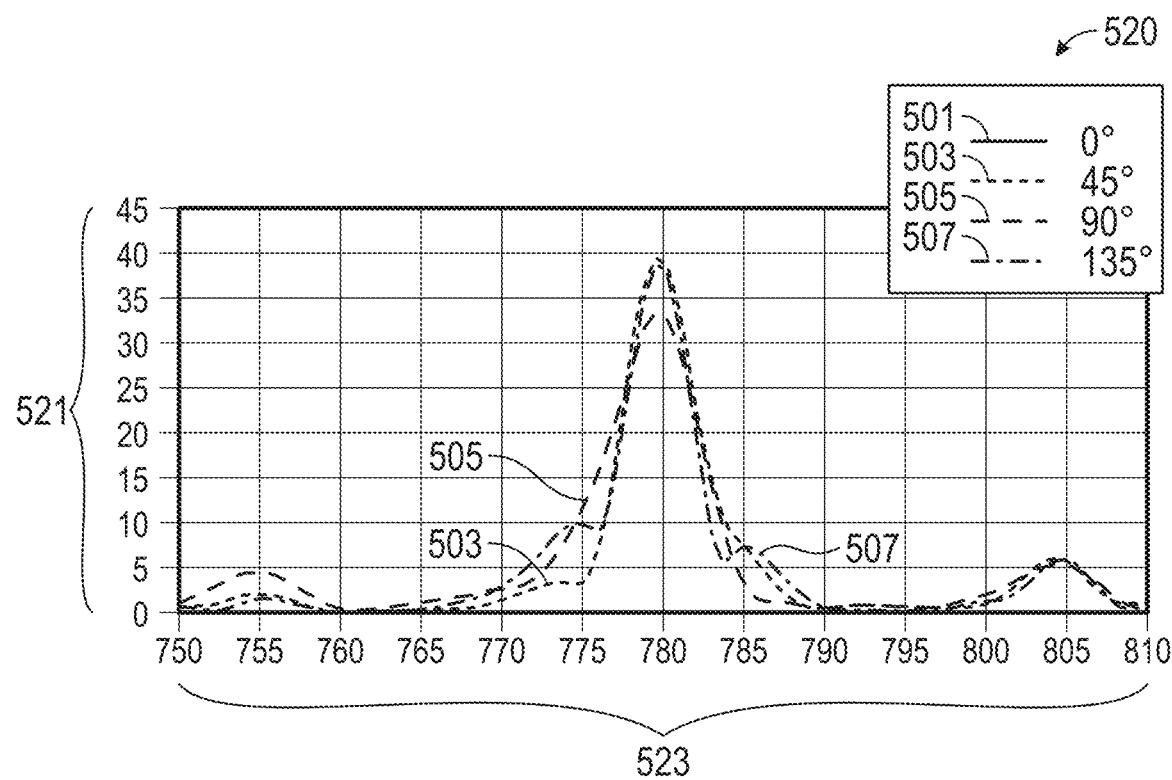

FIGS. 5A and 5B show examples of graphs of Fourier transform amplitudes versus thickness (in units of micrometers, μm) for the received signals of FIGS. 4A through 4D. Each of the graphs indicate a polarization state of the interrogating beam of light at about 0 degrees 501, at about 45 degrees 503, at about 90 degrees 505, and at about 135 degrees 507.

FIG. 5A shows an exemplary graph 500 indicating arbitrary units on the ordinate axis 509 (e.g., the square of the Fourier component) and units of microns on the abscissa 511 (x-axis or horizontal axis). The graph 500 indicates two distinct peaks; one peak is centered at approximately 5 μm and another peak is centered at approximately 25 μm. The two peaks are caused by reflection and/or scattering of laser light from the surface of a metal chuck holding the silicon wafer. A vacuum was applied to hold the wafer down during the measurement process. There is typically a small air gap between the wafer and the metal chuck. The two signatures are a result of the gap and caused by the underlying roughness of the metal surface. The air gap thickness is about 3.5 times the value as indicated in the graph. In other words, measurements of the sample comprise metal, air, and silicon instead of just silicon. However, the existence of these gaps does not change the measured thickness of silicon, but they introduce side peaks (as is also noted in FIG. 5B, below) in the vicinity of the main peak.

FIG. 5B shows an exemplary graph 520 indicating arbitrary units on the ordinate axis 521 and units of microns on the abscissa 523. The graph 520 indicates a distinct peak centered at approximately 780 μm. The silicon wafer under test in FIGS. 4A through 4D was approximately 780 μm in thickness. Consequently, a determination of the thickness of the silicon wafer can be determined using the apparatus shown and described in FIGS. 1 and 2, above.

Figure 6A:
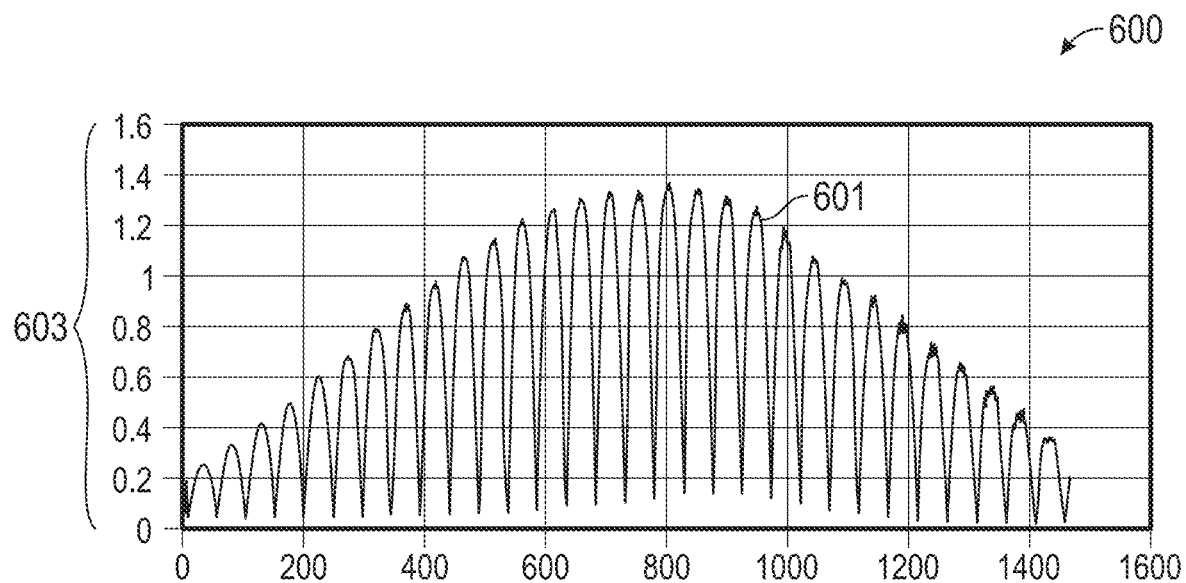
FIG. 6B shows an example graph of Fourier transform amplitudes versus thickness for the received signals of FIG. 6A.

FIG. 6A shows an example graph 600 of signals 601 received from a thinned silicon wafer having a nominal thickness of approximately 70 μm as a function of the wavelength of the interrogating laser. In this example, no polarization was applied to the interrogating beam. The received signals 601 are shown as a function of the wavelength of the interrogating laser. The ordinate axis is an arbitrary detector voltage 603 received by the system of FIGS. 1 and 2.

Figure 6B:
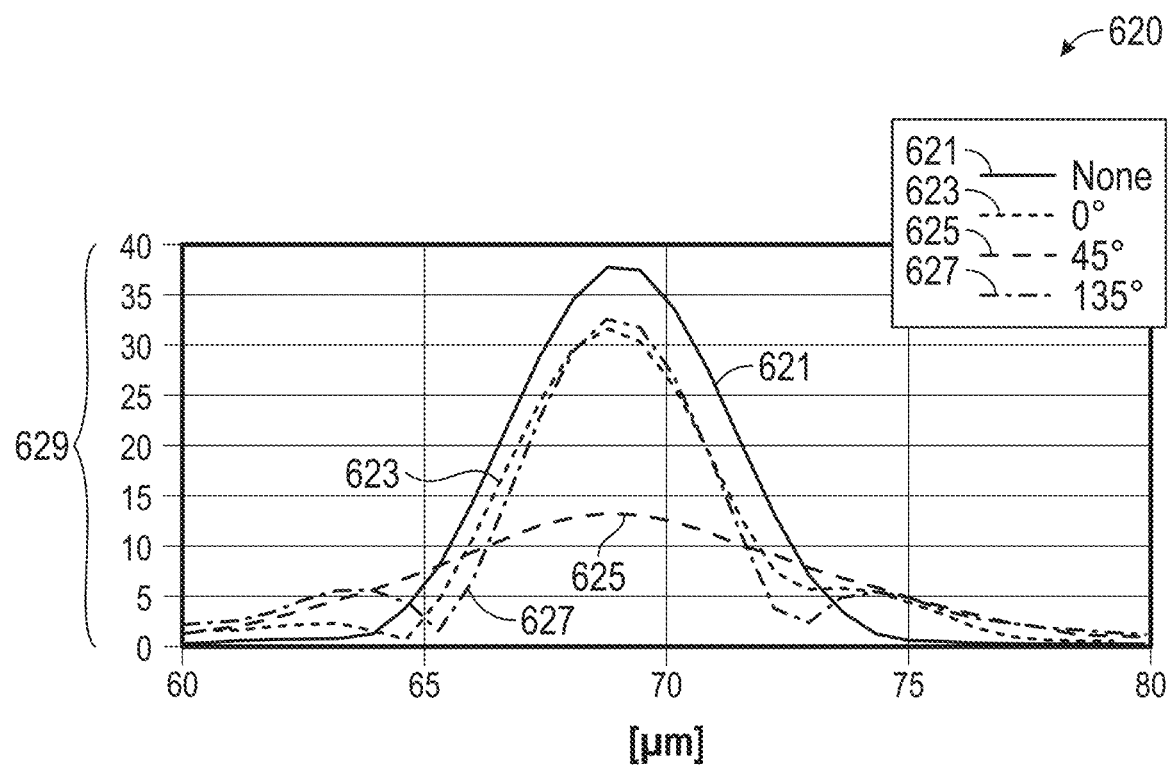

FIG. 6B shows an example graph 620 of Fourier transform amplitudes versus thickness for the received signals of FIG. 6A. Each of the transformed signals indicate a polarization state of the interrogating beam of light at no polarization 621, at about 0 degrees 623, at about 45 degrees 625, and at about 135 degrees 627. The graph 620 indicates a distinct peak centered slightly less than approximately 70 µm. The silicon wafer under test in FIG. 6A was approximately 70 µm in thickness. Consequently, a determination of the thickness of a thinned silicon wafer can be determined using the apparatus shown and described in FIGS. 1 and 2, above.

Figure 7:
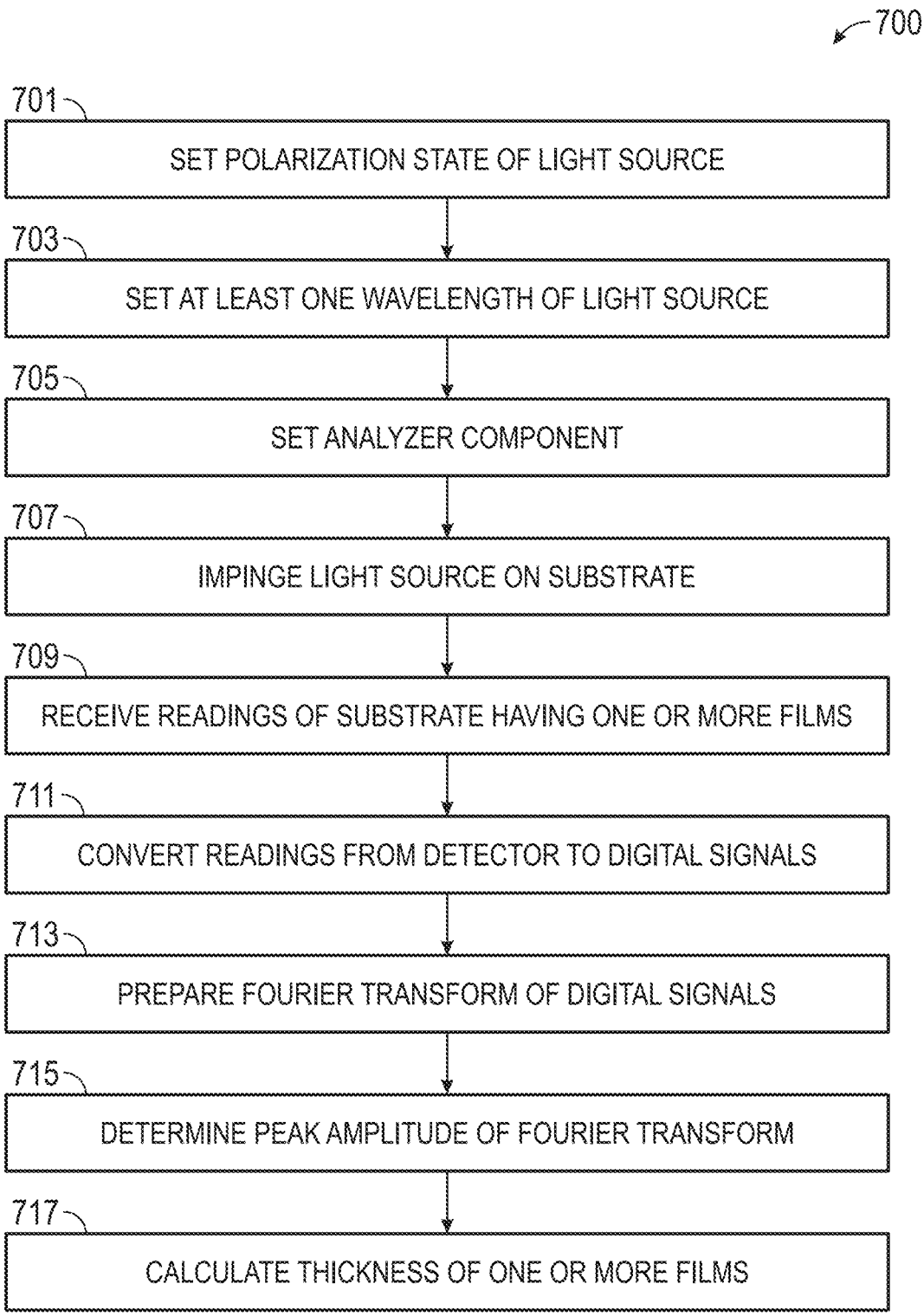
FIG. 7 shows a generalized example of a method for measuring the thickness of a substrate and films using the system of the disclosed subject matter in accordance with various embodiments.

FIG. 7 shows a generalized example of a method 700 for measuring the thickness of a substrate and films, if present, using the system of the disclosed subject matter in accordance with various embodiments. However, not all of the steps shown may be needed for a given operation. The exemplary steps can include at least some of the following steps discussed below. Also, the exemplary steps may be performed in a different order than shown the method 700 of FIG. 7. The method 700 is therefore provide as an example of how the apparatus of FIGS. 1 and 2 may be used to determine a thickness of a substrate including a substrate having films formed thereon. For example, if a substrate is known to not have chiral properties, or a film or films are known not to have induced stress, thereby potentially changing their optical properties, the steps of setting a polarization state of the light source of the apparatus or setting an analyzer component may not be needed.

In various embodiments, at operation 701, a polarization state of a light source (e.g., the light source 201 of FIG. 2) is set. At least one wavelength of the light source is set at operation 703. In the case of, for example, a swept laser being used as the light source, multiple wavelengths may be used and set to interrogate a substrate sequentially.

At operation 705, an analyzer component may be set as needed to determine a state of a signal received back from the substrate. A person of ordinary skill in the art will recognize that the setting of the analyzer component may be set later in the method 700. The light source is then impinged, substantially orthogonally, on a substrate under test at operation 707. In embodiments, the operations of setting the polarization state of the light source at operation 701 and setting the analyzer component at operation 705 may consist of the same operation if the polarizer and the analyzer comprise the same component.

At operation 709, readings (e.g., signals from reflected, refracted, or scattered light) are received from the substrate. As noted above, the substrate may contain one or more films formed thereon. In other embodiments, the substrate may not contain any films (or a film with a negligible thickness, such as native oxide formed on a silicon wafer). The readings from operation 709 are converted, at operation 711, from the detector (e.g., an analog signal) to digital signals through, for example, the ADC 107 of FIG. 1. In embodiments, operations 701 through operation 711 can be repeated multiple times to collect a spectrum of measurements at different wavelengths.

At operation 713, Fourier transforms of the digital signals of operation 709 are prepared. In various embodiments, operations 701 through 711 can be repeated with either a wavelength change or a polarization state change so that multiple data points are obtained before operation 713. One or more peak amplitudes of the Fourier transform are determined at operation 715. The thickness of the substrate and one or more films is calculated at operation 717 from the peak amplitudes determined at operation 715.

As used herein, the term "or" may be construed in an inclusive or exclusive sense. Further, other embodiments will be understood by a person of ordinary skill in the art based upon reading and understanding the disclosure provided. Moreover, the person of ordinary skill in the art will readily understand that various combinations of the techniques and examples provided herein may all be applied in various combinations.

Throughout this specification, plural instances may implement components, operations, or structures described as a single instance. Although individual operations are illustrated and described as separate operations, one or more of the individual operations may be performed concurrently, and, unless otherwise stated, nothing requires that the operations necessarily be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter described herein.

Further, although not shown explicitly but understandable to a skilled artisan, each of the various arrangements, quantities, and number of elements may be varied (e.g., the number and types of light sources and optical elements). Moreover, each of the examples shown and described herein is merely representative of one possible configuration and should not be taken as limiting the scope of the disclosure.

Although various embodiments are discussed separately, these separate embodiments are not intended to be considered as independent techniques or designs. As indicated above, each of the various portions may be inter-related and each may be used separately or in combination with other embodiments discussed herein. For example, although various embodiments of operations, systems, and processes have been described, these methods, operations, systems, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to ascertain quickly the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

The description provided herein includes illustrative examples, devices, and apparatuses that embody various aspects of the matter described in this document. In the description, for purposes of explanation, numerous specific details are set forth in order to provide an understanding of various embodiments of the matter discussed. It will be evident however, to those of ordinary skill in the art, that various embodiments of the disclosed subject matter may be practiced without these specific details. Further, well-known structures, materials, and techniques have not been shown in detail, so as not to obscure the various illustrated embodiments. As used herein, the terms "about," "approximately," and "substantially" may refer to values that are, for example, within ±10% of a given value or range of values.

The Following Numbered Examples are Specific Embodiments of the Disclosed Subject Matter Example 1: A metrology apparatus to measure a thickness of a substrate. The metrology apparatus includes an illumination source directed substantially orthogonally to an upper surface of the substrate and a polarizer coupled between the illumination source and the substrate. The substrate is to receive light from the illumination source after the light passes through the polarizer in a pre-determined state of polarization. An optical detector is to receive light returned from the substrate, the optical detector is arranged substantially orthogonally to the upper surface of the substrate and between the illumination source and the substrate. An analyzer is coupled between the substrate and the optical detector. The analyzer is configured to determine an angle in the plane of polarization to which the light received from the substrate has been rotated due to optical properties of at least one of the substrate and films formed on the substrate.

Example 2. The metrology apparatus of Example 1, further including a compensator coupled between the substrate and the optical detector.

Example 3. The metrology apparatus of either Example 1 or Example 2, wherein the illumination source comprises at least one laser.

Example 4. The metrology apparatus of any one of the preceding Examples, wherein the illumination source comprises at least one laser having a plurality of selectable wavelengths.

Example 5. The metrology apparatus of one of the preceding Examples, further including at least one optical compensator to determine an optical path difference between the illumination source and the received light returned back from the substrate.

Example 6. The metrology apparatus of one of the preceding Examples, wherein the illumination source is configured to be modified to a polarization state to match an eigenmode of the substrate.

Example 7. The metrology apparatus of one of the preceding Examples, wherein the substrate includes an optical anisotropy.

Example 8. The metrology apparatus of Example 7, wherein the optical anisotropy comprises chiral properties.

Example 9. The metrology apparatus of one of the preceding Examples, wherein each of the polarizer and the analyzer are located in a common optical path.

Example 10. A method for measuring the thickness of a substrate. The method includes setting a polarization state of a light source; selecting at least one wavelength from the light source; setting an analyzer component based on a returned light signal from the substrate; impinging a beam of light from the light source substantially orthogonally onto the substrate; and calculating a thickness of the substrate based on the returned light signal from the substrate.

Example 11. The method of Example 10, further including calculating a thickness of films formed on the substrate based on the returned light signal from the substrate and the films.

Example 12. The method of either Example 10 or Example 11, further including receiving readings from the substrate, the readings being based on signals from the impinged beam of light on the substrate being reflected, refracted, or scattered from the substrate.

Example 13. The method of any one of Example 10 through Example 12, further including converting the received readings to digital signals.

Example 14. The method of Example 13, further including preparing a Fourier transform of the digital signals; and determining a peak amplitude of the Fourier transform.

Example 15. The method of any one of Example 10 through Example 14, further including receiving the returned light signal from the substrate in a common optical path along which the beam of light is transmitted to the substrate.

Example 16. The method of any one of Example 10 through Example 15, further including setting the polarization state to match an eigenmode of the substrate.

Example 17. A metrology apparatus to measure a thickness of a substrate having chiral properties. The metrology apparatus includes an illumination source directed substantially orthogonally to an upper surface of the substrate and a polarizer coupled between the illumination source and the substrate. The substrate is to receive light from the illumination source after the light passes through the polarizer in a pre-determined plane of polarization. An optical detector is to receive light returned from the substrate, with the optical detector arranged substantially orthogonally to the upper surface of the substrate. An analyzer is coupled between the substrate and the optical detector. The analyzer is to determine an angle in the plane of polarization to which the light received from the substrate has been rotated due to the chiral properties of the substrate, with each of the polarizer and the analyzer being located in a common optical path. At least one optical compensator is to determine an optical path difference between the illumination source and the received light returned back from the substrate.

Example 18. The metrology apparatus of Example 17, wherein the optical detector comprises a photodetector.

Example 19. The metrology apparatus of either Example 17 or Example 18, wherein the optical detector comprises a spectrometer.

Example 20. The metrology apparatus of any one of Example 17 through Example 19, wherein the illumination source is configured to be rotated to a polarization state to match an eigenmode of silicon.

Example 21. The metrology apparatus of any one of Example 17 through Example 20, further including a collimator to convert diverging light emitted by the illumination source into a parallel beam of light directed substantially orthogonally to the upper surface of the substrate; and an objective lens to collect the received light returned from the substrate.

What is claimed is:

1. A metrology apparatus to measure a thickness of a substrate, the metrology apparatus comprising:
   an illumination source directed substantially orthogonally to an upper surface of the substrate;
   a polarizer coupled between the illumination source and the substrate, the substrate to receive light from the illumination source after the light passes through the polarizer in a pre-determined state of polarization substantially orthogonally to the upper surface of the substrate, wherein the pre-determined state of polarization substantially matches an eigenmode of the substrate;

an optical detector to receive light returned from the substrate, the optical detector arranged substantially orthogonally to the upper surface of the substrate and between the illumination source and the substrate; and an analyzer coupled between the substrate and the optical detector, the analyzer to determine an angle in a plane of polarization to which the light received from the substrate has been rotated due to optical properties of at least one of the substrate and films formed on the substrate.

2. The metrology apparatus of claim 1, further comprising a compensator coupled between the substrate and the optical detector.

3. The metrology apparatus of claim 1, wherein the illumination source comprises at least one laser.

4. The metrology apparatus of claim 1, wherein the illumination source comprises at least one laser having a plurality of selectable wavelengths.

5. The metrology apparatus of claim 1, further comprising at least one optical compensator to determine an optical path difference between the illumination source and the received light returned back from the substrate.

6. The metrology apparatus of claim 1, wherein the substrate includes an optical anisotropy.

7. The metrology apparatus of claim 6, wherein the optical anisotropy comprises chiral properties.

8. The metrology apparatus of claim 1, wherein each of the polarizer and the analyzer are located in a common optical path.

9. A method for measuring a thickness of a substrate, the method comprising:

setting a polarization state of a light source, the polarization state substantially matching an eigenmode of the substrate;

selecting at least one wavelength from the light source;

setting an analyzer component based on a returned light signal from the substrate;

impinging a beam of light from the light source substantially orthogonally onto the substrate; and calculating a thickness of the substrate based on the returned light signal from the substrate.

10. The method of claim 9, further comprising calculating a thickness of films formed on the substrate based on the returned light signal from the substrate and the films.

11. The method of claim 9, further comprising receiving readings from the substrate, the readings being based on signals from the impinged beam of light on the substrate being reflected, refracted, or scattered from the substrate.

12. The method of claim 11, further comprising converting the received readings to digital signals.

13. The method of claim 12, further comprising:
preparing a Fourier transform of the digital signals; and
determining a peak amplitude of the Fourier transform.

14. The method of claim 9, further comprising receiving the returned light signal from the substrate in a common optical path along which the beam of light is transmitted to the substrate.

15. A metrology apparatus to measure a thickness of a substrate having chiral properties, the apparatus comprising:

an illumination source directed substantially orthogonally to an upper surface of the substrate, wherein the illumination source is configured to be rotated to a polarization state to match an eigenmode of the substrate;

a polarizer coupled between the illumination source and the substrate, the substrate to receive light from the illumination source after the light passes through the polarizer in a pre-determined plane of polarization;

an optical detector to receive light returned from the substrate, the optical detector arranged substantially orthogonally to the upper surface of the substrate;

an analyzer coupled between the substrate and the optical detector, the analyzer to determine an angle in the plane of polarization to which the light received from the substrate has been rotated due to the chiral properties of the substrate, each of the polarizer and the analyzer being located in a common optical path; and at least one optical compensator to determine an optical path difference between the illumination source and the received light returned back from the substrate.

16. The metrology apparatus of claim 15, wherein the optical detector comprises a photodetector.

17. The metrology apparatus of claim 15, wherein the optical detector comprises a spectrometer.

18. The metrology apparatus of claim 15, further comprising:

a collimator to convert diverging light emitted by the illumination source into a parallel beam of light directed substantially orthogonally to the upper surface of the substrate; and an objective lens to collect the received light returned from the substrate.

* * * * *

UNITED STATES PATENT AND TRADEMARK OFFICE
CERTIFICATE OF CORRECTION

Page 1 of 1

PATENT NO. : 12,235,091 B2
APPLICATION NO. : 17/871384
DATED : February 25, 2025
INVENTOR(S) : Jian Ding It is certified that error appears in the above-identified patent and that said Letters Patent is hereby corrected as shown below:

In the Specification

Column no 3 Line no 12-13, "thickness for the received signals of FIG. 4A" to read as, "thickness for the received signals of FIGS. 4A."

Column no 7 Line no 63-64, "The interrogating laser was set to a polarization state of about degrees" to read as, "The interrogating laser was set to a polarization state of about 0 degrees"

Column no 8 Line no 4-5, "The interrogating laser was set to a polarization state of about degrees" to read as, "The interrogating laser was set to a polarization state of about 45 degrees"

Column no 8 Line no 12-13, "The interrogating laser was set to a polarization state of about degrees" to read as, "The interrogating laser was set to a polarization state of about 90 degrees"

Signed and Sealed this
Twenty-sixth Day of August, 2025

Coke Morgan Stewart
*Acting Director of the United States Patent and Trademark Office*